United States Patent [19]
Youngblood

[11] Patent Number: 6,137,189
[45] Date of Patent: Oct. 24, 2000

[54] LINE CIRCUIT APPARATUS FOR SUPPLYING POWER TO A TELEPHONE SET IN TELECOMMUNICATION SYSTEMS

[75] Inventor: Douglas L. Youngblood, Palm Bay, Fla.

[73] Assignee: Intersil Corporation, Palm Bay, Fla.

[21] Appl. No.: 09/365,238

[22] Filed: Jul. 30, 1999

[51] Int. Cl.[7] .................................................... H02J 1/00
[52] U.S. Cl. ............................................ 307/30; 379/413
[58] Field of Search .................................... 379/398, 413; 455/557; 358/468; 307/30

[56] References Cited

U.S. PATENT DOCUMENTS

| | | | |
|---|---|---|---|
| 5,247,566 | 9/1993 | Hiramatsu | 379/58 |
| 5,428,682 | 6/1995 | Apfel | 379/413 |

*Primary Examiner*—Josie Ballato
*Assistant Examiner*—Sharon Polk
*Attorney, Agent, or Firm*—Rogers & Killeen

[57] ABSTRACT

A subscriber line interface circuit ("SLIC") for a telecommunications device powered from a single power source and using a voltage regulator to limit the voltage across the terminals of the telecommunications device to a predetermined value below the industry standard voltage limits. The SLIC selectively enables or disables the speech amplifiers responsive to an external control signal that is independent of the on-hook/off-hook status of the telecommunications device. The SLIC provides a ringing signal and/or a caller identification signal through the speech amplifiers to the telecommunications device while the telecommunications device is on-hook.

15 Claims, 5 Drawing Sheets

LINE CIRCUIT APPARATUS FOR SUPPLYING POWER TO A TELEPHONE SET IN TELECOMMUNICATION SYSTEMS

BACKGROUND OF THE INVENTION

This invention relates to a subscriber loop interface circuit ("SLIC") and more specifically to a SLIC with a single power source and a voltage regulator. The SLIC provides on-hook signals such as a ringing signal and/or a caller identification signal through the speech amplifiers to the telecommunications device while the telecommunications device is on-hook while maintaining industry standard voltage limits across the terminals of the telecommunications device during all modes of operation.

A SLIC is generally employed in a subscriber loop as an interface between a subscriber network and a subscriber telecommunications device, such as a residential telephone, telephone answering machine, modem, or similar device. Generally, a subscriber loop includes a SLIC, a subscriber telecommunications device, and a pair of subscriber lines for connecting the SLIC to the subscriber telecommunications device. When a subscriber telecommunications device is in an off-hook condition, the subscriber lines, subscriber terminal device, and SLIC together may form a continuous circuit for establishing two-way communications between the SLIC and the subscriber telecommunications device.

Typically, a SLIC supplies different voltages to a telecommunications device depending on whether the telecommunications device is on-hook/off-hook, or if the telecommunications device is to ring, e.g., to notify the telecommunications device of the presence of an incoming call. Well known industry standards set maximum limits for voltages appearing across the terminals of a telecommunications device for on-hook/off-hook conditions (approximately −56V), and ringing conditions (approximately −120 $V_{RMS}$).

Prior art non-ringing SLICs for traditional POTS systems are designed to meet the above requirements by using two separate voltage sources, $V_{BAT}$ and $V_{RING}$, that power separate circuits for on-hook/off-hook condition and for ringing conditions, as illustrated in FIGS. 1 and 2. Typically, $V_{BAT}$ supplies power during on-hook/off-hook conditions and $V_{RING}$ supplies power during ringing conditions. A switch is used to alternately connect $V_{BAT}$ or $V_{RING}$ to the telecommunications device.

FIG. 1 illustrates a typical subscriber loop of a POTS system including a non-ringing SLIC 100 which contains the on-hook/off-hook circuits. The power supply 104 ("$V_{BAT1}$") supplies power to the non-ringing SLIC 100. The power supply 105 ("$V_{RING1}$") supplies power to the ring generator 101 which provides the ringing signal to the subscriber phone 106. The switch 103 alternately connects the subscriber phone 106 to the non-ringing SLIC 100, thereby supplying power to the subscriber phone 106 from $V_{BAT}$, and the ring generator 101, thereby supplying power to the subscriber phone 106 from $V_{RING}$, in response to a signal from the ring command generator 102.

$V_{BAT}$ typically supplies power to the non-ringing SLIC 100 at a voltage less than the industry standard maximum voltage of approximately −56 V ("$V_{MAX}$") across the terminals of the subscriber phone 106 ("$V_{TERM}$").

FIG. 2 illustrates another well-known subscriber loop of a POTS system whose operation is essentially similar to the device in FIG. 1. Like components are given similar numbers in FIGS. 1 and 2.

Prior art ringing SLICs use two power supplies as well as complex control and selection circuits, as illustrated in FIG. 3, or a single programmable power supply, as illustrated in FIG. 4, to ensure that the correct voltage is applied to the on-hook/off-hook circuits as well as the ringing circuits without exceeding the industry standard maximum voltage limits for the on-hook/off-hook condition. However, both of these solutions are undesirable because they substantially increase the cost and complexity of the ringing SLIC.

FIG. 3 illustrates a typical subscriber loop including a ringing SLIC 210 which contains both the on-hook/off-hook circuits 203 and the ringing circuits 204. The power supply 207 ("$V_{BAT2}$") and the power supply 208 ("$V_{RING2}$") supply power to the ringing SLIC 210. A ringing SLIC of this type requires the addition of the control circuits 201 and the voltage select circuits 200 in order to apply the proper voltage to the subscriber phone 206 for the different operating conditions of the subscriber phone 206 without allowing $V_{TERM}$ to exceed $V_{MAX}$.

FIG. 4 illustrates another well-known ringing SLIC 210 where the voltage select circuits 200 and $V_{BAT2}$ and $V_{RING2}$ are replaced by a programmable power supply 209. Like components are given similar numbers in FIGS. 3 and 4.

A ringing SLIC of the present invention avoids the problems of the prior art by using a single power source in conjunction with a voltage regulator, as illustrated in FIG. 5. The single power supply supplies sufficient voltage to provide a ringing signal to the telecommunications device during ringing conditions. The voltage regulator limits the voltage across the terminals of the telecommunications device to a predetermined value below the industry standard voltage limits during on-hook/off-hook conditions. The SLIC selectively enables or disables the speech amplifiers responsive to an external control signal that is independent of the on-hook/off-hook status of the telecommunications device. The SLIC provides on-hook signals such as a ringing signal and/or a caller identification signal through the speech amplifiers to the telecommunications device while the telecommunications device is on-hook.

Accordingly, it is an object of the present invention to obviate the above problems in the prior art and to provide a novel SLIC and method in a subscriber loop.

It is another object of the present invention to provide a novel SLIC and method which requires only one power supply.

It is yet another object of the present invention to provide a novel SLIC and method with a voltage regulator for maintaining the voltage across the telecommunications device below the industry standard maximum voltage during all modes of operation.

It is still another object of the present invention to provide a novel SLIC and method for enabling the speech amplifiers in response to an external control signal that is not a function of the off-hook status of the telecommunications device.

It is a further object of the present invention to provide a novel SLIC and method for selectively enabling the speech amplifiers to provide a ringing signal and/or a caller identification signal while the telecommunications device is on-hook.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
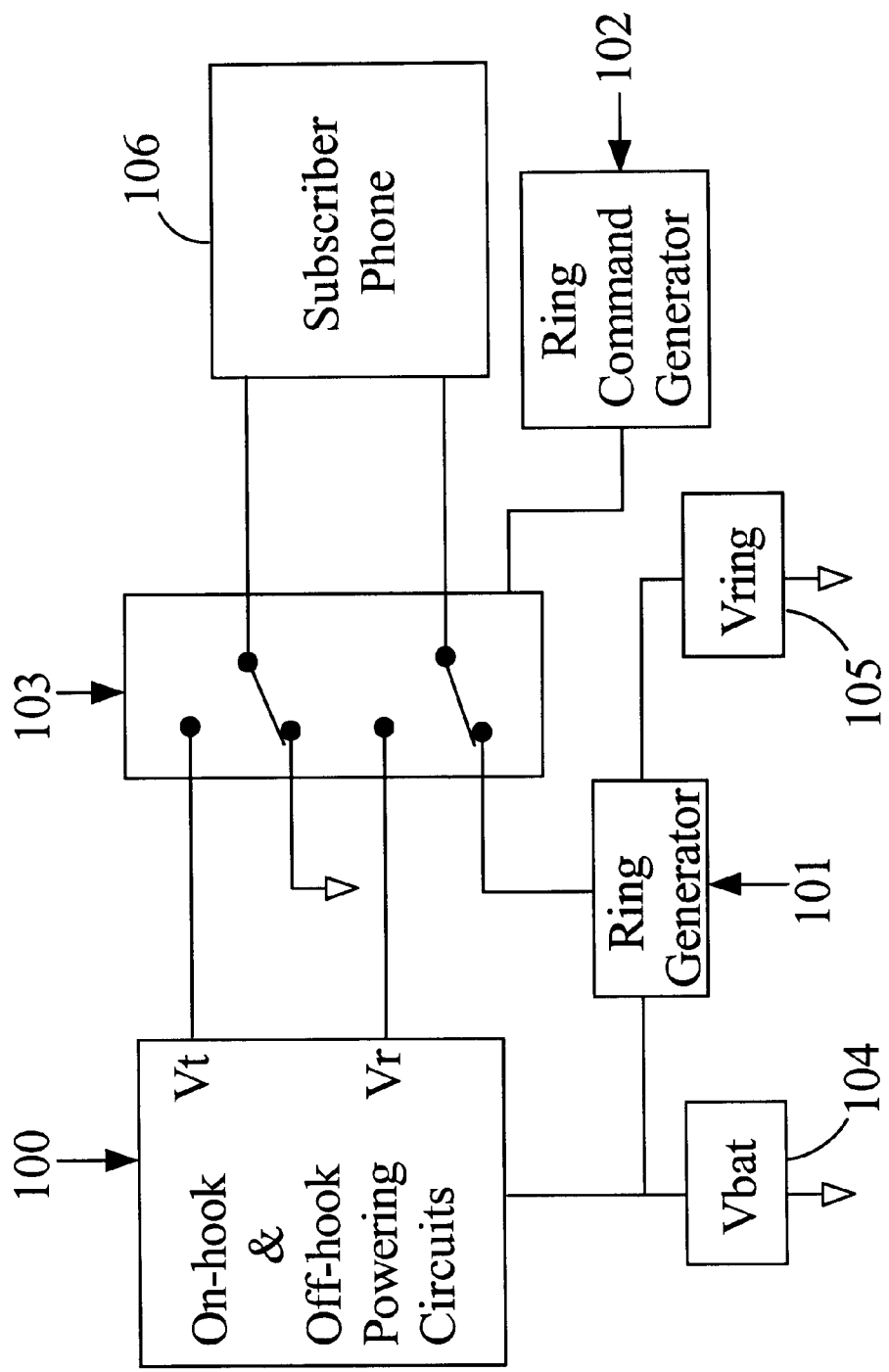
FIG. 1 is a schematic circuit diagram of a traditional POTS prior art subscriber loop system with non-ringing SLICs.
Figure 2:
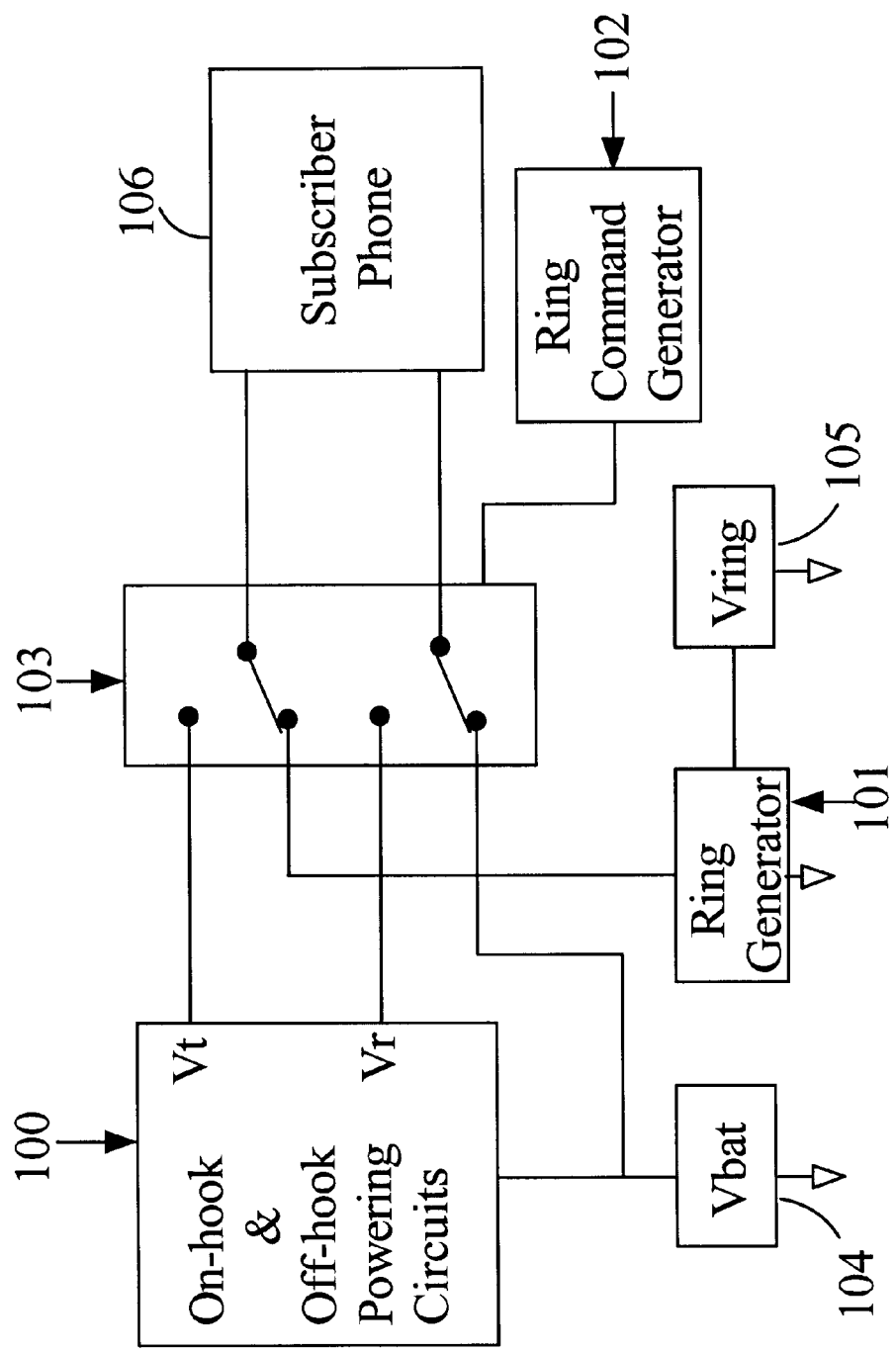
FIG. 2 is a schematic circuit diagram of a traditional POTS prior art subscriber loop system with non-ringing SLICs.
Figure 3:
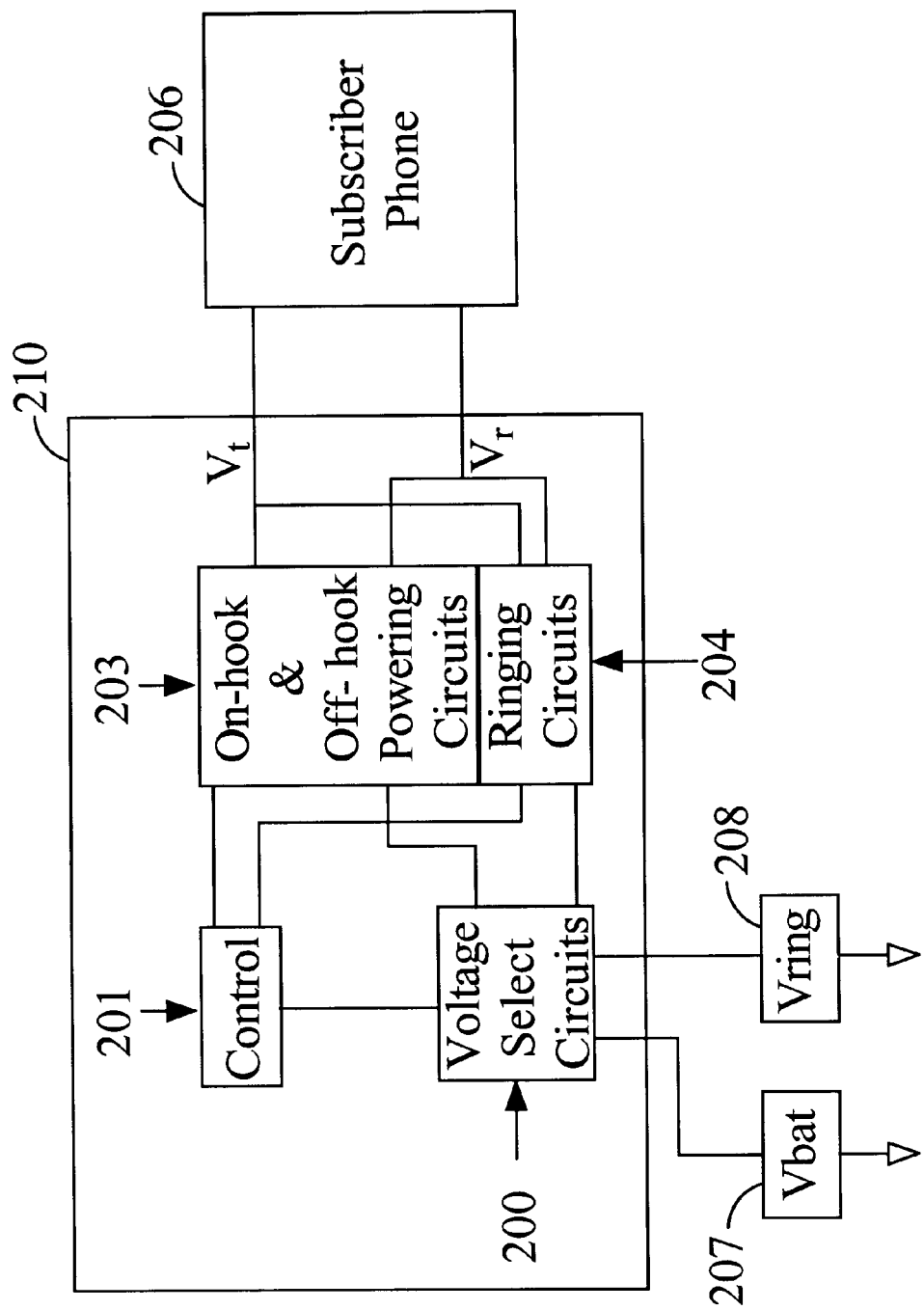
FIG. 3 is a schematic circuit diagram of a prior art subscriber loop system with a ringing SLIC and control and voltage selection circuits.
Figure 4:
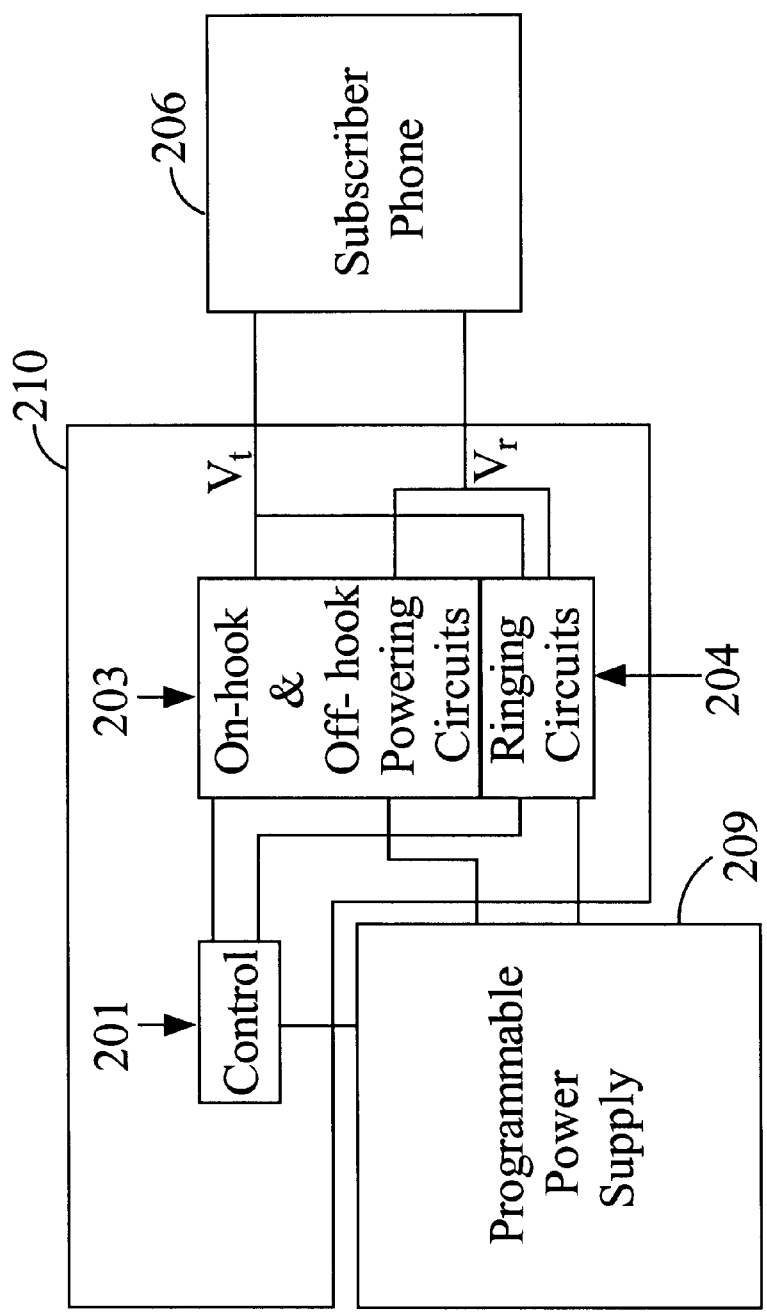
FIG. 4 is a schematic circuit diagram of a prior art subscriber loop system with a ringing SLIC and a programmable power supply.
Figure 5:
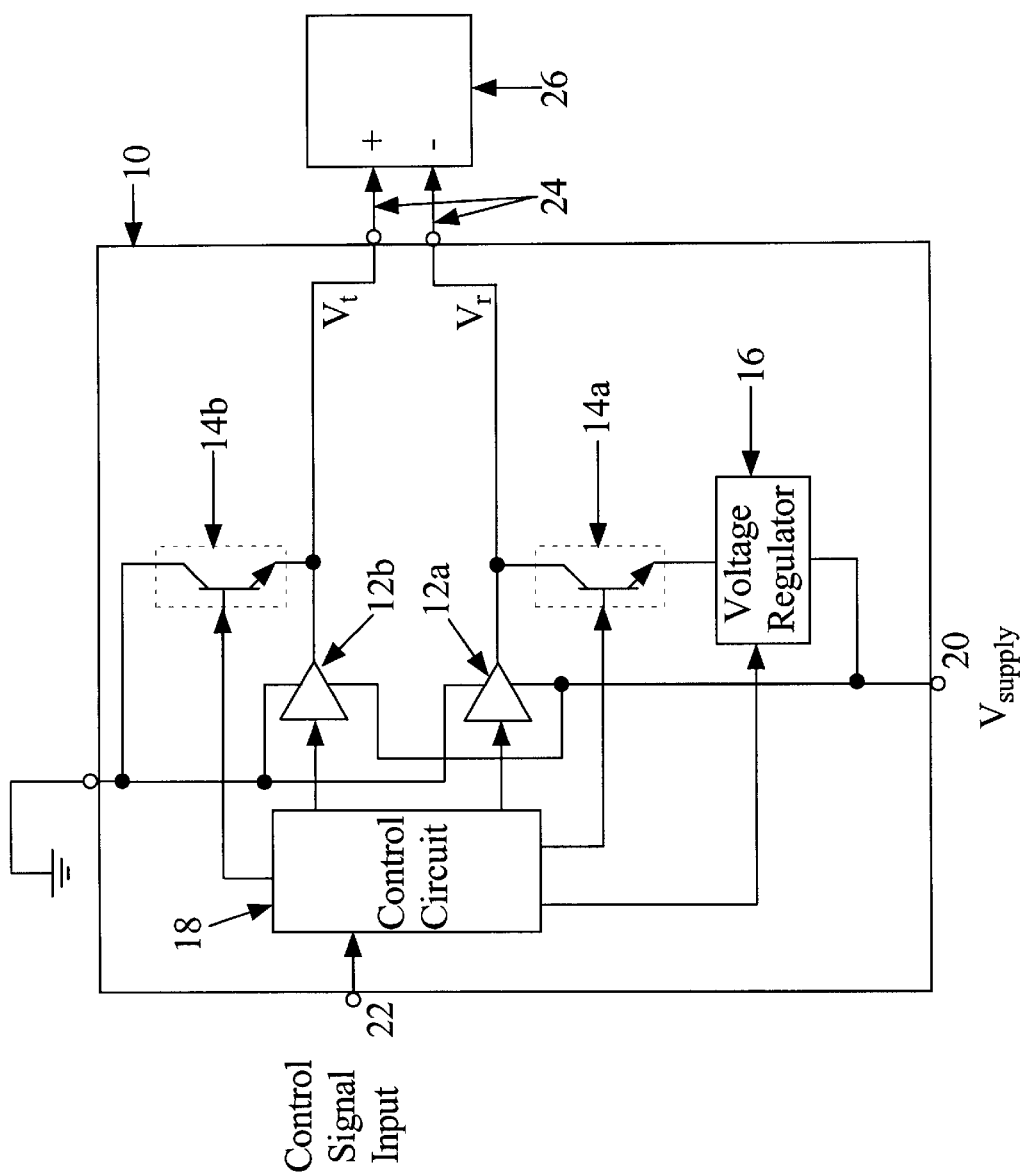
FIG. 5 is a schematic circuit diagram of a subscriber loop system including one embodiment of the present invention.

With reference to FIG. 5, in a preferred embodiment of the SLIC 10 is connected to a telecommunications device 26 through subscriber lines 24. The power supply 20 supplies a voltage, $V_{SUPPLY}$, to the speech amplifiers 12a and 12b and the voltage regulator 16. $V_{SUPPLY}$ is typically approximately −100 V. The control circuit 18, in response to one or more external control signals 22, selectively enables the speech amplifiers 12a and 12b and disables the switches 14a and 14b and the voltage regulator 16 or selectively disables the speech amplifiers 12a and 12b and enables the switches 14a and 14b and the voltage regulator 16, as will be explained below.

When the telecommunications device 26 is on-hook in a non-ringing condition, the voltage across the terminals of the telecommunications device 26 ("$V_{TERM}$") is desirably below the industry standard maximum voltage of approximately −56 V ("$V_{MAX}$"). $V_{TERM}$ is maintained below $V_{MAX}$ in one of two ways. In the first method, $V_{TERM}$ is maintained below $V_{MAX}$ by using the speech amplifiers. The control circuit 18, in response to a control signal 22, enables the speech amplifiers 12a and 12b while disabling the switches 14a and 14b and the voltage regulator 16. In this configuration, $V_{TERM}$ is maintained below $V_{MAX}$ by the well-known method of setting the speech amplifiers 12a and 12b to a predetermined output value, such as −50 V.

The second, and novel, method uses the switches 14a and 14b and the voltage regulator 16 to maintain $V_{TERM}$ below $V_{MAX}$. The control circuit 18, in response to a control signal 22, disables the speech amplifiers 12a and 12b while enabling the switches 14a and 14b and the voltage regulator 16. In this configuration, the voltage regulator 16 is set to limit the voltage to the switch 14a to a predetermined value, $V_{REF}$, where $V_{REF}$ is less than $V_{MAX}$, thus maintaining $V_{TERM}$ below $V_{MAX}$.

$V_{REF}$ is preferentially set less than $V_{MAX}$. Therefore, for $V_{SUPPLY}$ less than or equal to $V_{REF}$, $V_{TERM}$ is approximately equal to $V_{SUPPLY}$. For $V_{SUPPLY}$ greater than $V_{REF}$, $V_{TERM}$ is approximately equal to $V_{REF}$.

When the telecommunications device 26 is on-hook, the typical configuration for the SLIC 10, as described above, is that the speech amplifiers 12a and 12b are disabled and the switches 14a and 14b and the voltage regulator 16 are enabled. In this configuration, when a ringing or other typical on-hook signal is to be sent to the telecommunications device 26, the control circuit 18, in response to control signal 22 that is independent of the off-hook status of the telecommunications device 26, disables the switches 14a and 14b and the voltage regulator 16 while enabling the speech amplifiers 12a and 12b. The ringing signal is then transmitted to the telecommunications device 26 through the speech signal amplifiers 12a and 12b. The above procedure also applies if a data signal, such as a caller identification signal, is to be sent to the telecommunications device 26 while the telecommunications device is on-hook.

When the telecommunications device 26 is on-hook and the SLIC 10 is in the above-described typical on-hook configuration and the telecommunications device changes status from on-hook to off-hook, the configuration of the SLIC 10 changes. The control circuit 18, in response to control signal 22, enables the speech amplifiers 12a and 12b while disabling the switches 14a and 14b and the voltage regulator 16. In this configuration, $V_{TERM}$ is maintained below $V_{MAX}$ by the well-known method of setting the speech amplifiers 12a and 12b to a predetermined output value, such as −50 V.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A power supply for a telecommunications device comprising:
    a source of power;
    first and second speech amplifiers;
    first and second switches;
    a voltage regulator; and
    control circuit responsive to one or more external control signals for either (a) operatively connecting said source of power to said speech amplifiers while operatively disconnecting said source of power from said switches and said voltage regulator or (b) operatively connecting said source of power to said switches and said voltage regulator while operatively disconnecting said source of power to said speech amplifiers.

2. The power supply of claim 1 wherein said voltage regulator provides an output voltage equal to the voltage of said source when the voltage of said source is below a predetermined voltage and said predetermined voltage when the voltage of said source is above said predetermined voltage.

3. The power supply of claim 2 wherein said control signals are not a function of the off-hook status of the telecommunications device.

4. The power supply of claim 2 wherein said speech amplifiers maybe selectively enabled to provide at least one of a ringing signal or a caller identification signal while the telecommunications device is on-hook.

5. The power supply of claim 2 wherein said control signals are a function of the presence of at least one of control, voice, data, or ringing instructions.

6. An apparatus for supplying power to a telecommunications device comprising:
    a source of power;
    first speech amplifier operatively connected to a control circuit, the negative terminal of said telecommunications device, said source of power, and ground;
    second speech amplifier operatively connected to said control circuit, the positive terminal of said telecommunications device, said source of power, and ground;
    first switch operatively connected to said control circuit, the negative terminal of said telecommunications device, and a voltage regulator;
    second switch operatively connected to said control circuit, the positive terminal of said telecommunications device, and ground;

said voltage regulator operatively connected to said control circuit, said source of power, and said first switch; and said control circuit responsive to one or more external control signals for selectively enabling said first and second speech amplifiers while disabling said first and second switches and said voltage regulator, and for selectively disabling said first and second speech amplifiers while enabling said first and second switches and said voltage regulator.

7. The apparatus of claim 6 wherein said voltage regulator provides an output voltage equal to the voltage of said source when the voltage of said source is below a predetermined voltage and said predetermined voltage when the voltage of said source is above said predetermined voltage.

8. The power supply of claim 7 wherein said control signals are not a function of the off-hook status of the telecommunications device.

9. The power supply of claim 7 wherein said speech amplifiers may be selectively enabled to provide at least one of a ringing signal or a caller identification signal while the telecommunications device is on-hook.

10. The power supply of claim 7 wherein said control signals are a function of the presence of at least one of control, voice, data, or ringing instructions.

11. A method for supplying power to a telecommunications device comprising:

providing a source of power;

providing first and second speech amplifiers;

providing first and second switches;

providing a voltage regulator; and providing a control circuit responsive to one or more external control signals for either (a) operatively connecting said source of power to said speech amplifiers while operatively disconnecting said source of power from said switches and said voltage regulator or (b) operatively connecting said source of power to said switches and said voltage regulator while operatively disconnecting said source of power to said speech amplifiers.

12. The method of claim 11 wherein said voltage regulator provides an output voltage equal to the voltage of said source when the voltage of said source is below a predetermined voltage and said predetermined voltage when the voltage of said source is above said predetermined voltage.

13. The method of claim 12 wherein said control signals are not a function of the off-hook status of the telecommunications device.

14. The power supply of claim 12 wherein said control signals are a function of the presence of at least one of control, voice, data, or ringing instructions.

15. The power supply of claim 12 wherein said speech amplifiers may be selectively enabled to provide at least one of a ringing signal or a caller identification signal while the telecommunications device is on-hook.

* * * * *